H. F. MANNING.
STEERING GEAR FOR TRACTION ENGINES.
APPLICATION FILED FEB. 7, 1913.
1,105,086.
Patented July 28, 1914.
2 SHEETS—SHEET 1.
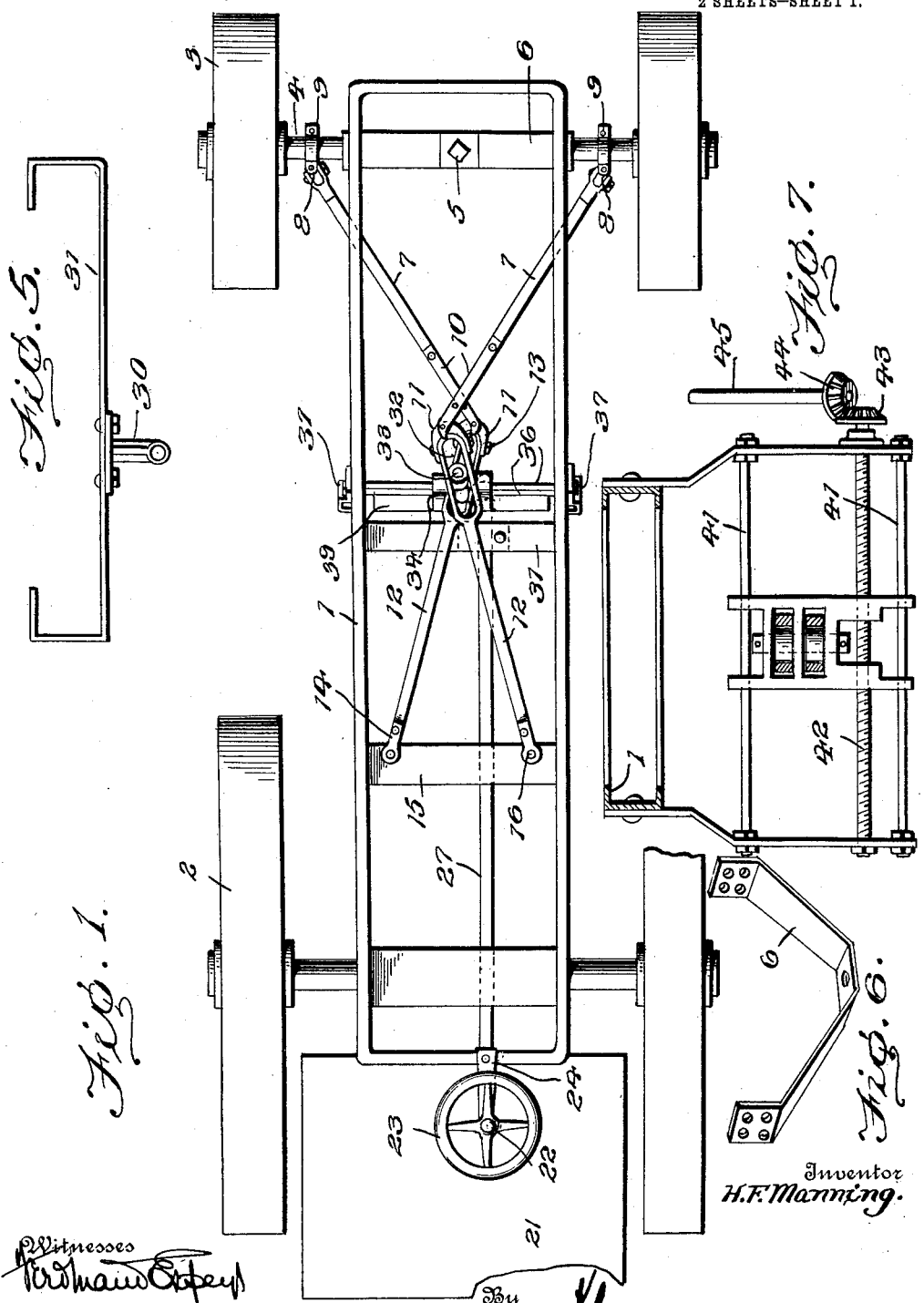

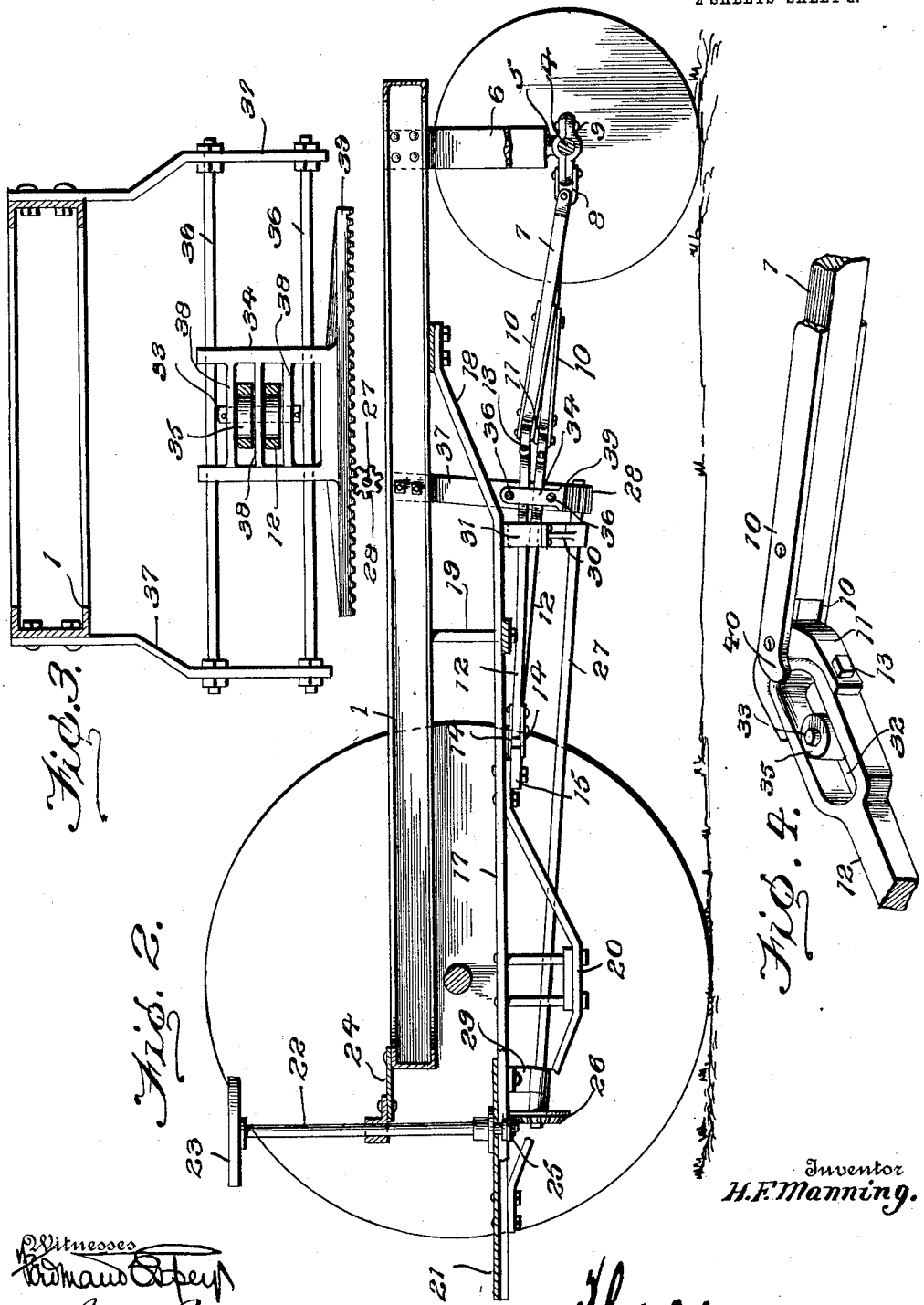

UNITED STATES PATENT OFFICE.

HARRY F. MANNING, OF PEORIA, ILLINOIS.

STEERING-GEAR FOR TRACTION-ENGINES.

1,105,086.  Specification of Letters Patent.  Patented July 28, 1914.

Application filed February 7, 1913. Serial No. 746,951.

*To all whom it may concern:*

Be it known that I, HARRY F. MANNING, citizen of the United States, residing at Peoria, in the county of Peoria and State of Illinois, have invented certain new and useful Improvements in Steering-Gear for Traction-Engines, of which the following is a specification.

This invention relates to steering gear for traction engines, and has for its object the provision of simple and efficient means whereby the front axle may be turned at an angle to the longitudinal axis of the engine frame so that the machine will turn to either side as may be desired.

A further object of the invention is to provide means for turning the front axle at an angle, as stated, which will be simple and efficient and act directly upon the ends of the axle so that the axle will be turned positively and easily.

A further object of the invention is to provide means for turning the axle at an angle which will be supported upon the frame of the vehicle below the body of the same and will operate easily and without excessive friction.

The invention is illustrated in the accompanying drawings and will be hereinafter first fully described and then more particularly pointed out in the claims following the detailed description.

In the drawings: Figure 1 is a plan view of my improved steering gear with so much of the frame of a traction engine as is necessary to illustrate the position of the several parts of the gear; Fig. 2 is a view partly in side elevation and partly in longitudinal section; Fig. 3 is an enlarged detail transverse section showing the manner of supporting the transversely moving carriage; Fig. 4 is a detail perspective view showing the connection between the members of the toggle constituting the axle-actuating devices; Fig. 5 is a detail elevation showing a hanger and bearing for the steering shaft; Fig. 6 is a detail perspective view of the support for the front end of the engine frame; Fig. 7 is a view showing a modification.

The engine frame 1 may be of any convenient or preferred construction and is illustrated in the accompanying drawings as constructed of channel iron and of an oblong form, the driving or traction wheels 2 being mounted upon the said frame at or near the rear end thereof in any convenient manner. The front steering wheels 3 are carried by a front axle 4 which is supported by a suitable king bolt 5 at the center of a hanger 6 which is secured to the frame at or near the front end thereof and depends from the same. This hanger is substantially V-shaped so that its sides will converge downwardly toward its center to directly support the king bolt and the front axle and also to provide clearance for the front steering bars or members of the toggle. The said front members or steering levers 7 have their front ends connected by gimbal joints 8 or other form of universal couplings with clamps 9 whereby they are firmly connected with the axle, the said clamps being securely fastened about the axle adjacent the steering wheels, as clearly shown in Fig. 1. The steering bars or levers 7 converge from the ends of the axle toward the longitudinal axis of the engine frame and are equipped at their inner ends upon their upper and lower sides with straps 10 which project over and are pivoted to segmental blocks 11 which in turn fit around the front ends of the rear steering bars 12 and are pivoted to the sides of the same by cap-screws or other forms of pivot pins 13 which are inserted through the ends of the segmental blocks into the sides of the rear steering bars. The rear steering bars 12 are equipped at their rear ends with upper and lower straps 14 which extend above and below a cross bar 15 and are pivoted to the same, as indicated at 16, whereby the said bars may move freely laterally but will be prevented from vertical movement. The cross bar 15 is secured to and extends between longitudinal side bars or beams 17 which have their front ends turned upwardly, as indicated at 18, and rigidly secured to the lower edges of the sides of the main frame 1, as will be readily understood. Hangers or posts 19 may be provided to secure the intermediate portions of the side bars or beams 17 with the side bars of the main frame and the rear portions of the said beams 17 may be reinforced by struts 20 bolted to the under sides of the beams, as shown in Fig. 2, the front ends of these struts being secured to the beams by the same bolts that secure the cross bar 15 thereto. A platform 21 is carried by the rear ends of the beams 17, and mounted in the said platform is a steering post 22 equipped with a hand wheel 23 at its upper end and being additionally supported by a bracket or brace 24 secured to and projecting from the rear end of the main frame. The lower end of the steering post 22 is equipped with a bevel pinion 25 meshing with a bevel gear 26 on the rear end of a steering shaft 27 which extends longitudinally of the frame and is equipped with a spur pinion 28 at its front end. A bearing bracket 29 is secured to and depends from the beam 17 to support the rear end of the shaft 27 and the front end of said shaft is supported in a similar bearing bracket 30 which is secured to and depends from a hanger 31 secured to and extending between the beams 17 adjacent the upturned portions 18 of the same, as shown.

The forward ends of the rear steering bars 12 are constructed with longitudinal slots 32 which extend to the extremities of the respective bars and receive a pivot pin 33 mounted in the carriage 34, rollers 35 being mounted upon the said pivot pin within the slots so as to reduce the frictional wear. It will be readily noted upon reference to Fig. 1 that the rear steering bars converge forwardly and extend beyond the pivot pin 33 so that the rear steering bar and the front steering bar at the same side of the engine together constitute a toggle connecting the front axle with the cross bar 15. It will also be noted that as the rear ends of the rear steering bars are pivoted at fixed points, if the front ends of these bars be moved to either side, there will be a tendency to either straighten or collapse the toggle according to the direction of movement and consequently, the front axle will be turned about the king bolt 5. To accomplish this lateral movement of the front ends of the rear steering bars, I provide the carriage 34 with the pivot pin 33 therein and the said carriage consists substantially of side bars or standards slidably mounted upon rods 36 which are secured at their ends rigidly in the hangers 37 secured to and depending from the main frame 1. Transverse bars 38 extend between the sides or standards of the carriage between the upper and lower guide rods 36 and the ends of the bars 12 project between the said transverse bars 38, as shown most clearly in Fig. 3. A rack bar 39 is rigid with the lower end of the carriage and extends to the opposite sides of the same, the said rack bar meshing directly with the pinion 28 on the front end of the shaft 27 so that, if the said pinion be rotated, movement will be imparted to the carriage to shift the same to one or the other side of the frame. This lateral movement of the carriage will be transmitted directly to the pivot pin 33 and through the same to the front ends of the rear steering bar, so that the said bars will be likewise shifted laterally. When the bars are thus shifted, the toggle at that side of the machine toward which the carriage moves will be straightened so that the corresponding end of the front axle will be pushed forward, and, simultaneously with this movement, the toggle at the opposite side of the machine will tend to fold and pull rearwardly the adjacent end of the axle. The steering wheels will thus be brought to any desired angle relative to the main frame and will be held in such position until the carriage is shifted in the opposite direction to return the axle to its normal position at a right angle to the longitudinal axis of the main frame.

It will be noted that the straps 10 at the inner ends of the front steering bars or levers are extended beyond their pivotal connections with the segmental blocks 11 and turned slightly toward the rear steering bars, as shown at 40, so as to project slightly over the front extremities of said bars, and the upper and lower edges of the said rear bars are made slightly convex at these points so that the frictional contact between the projecting ends 40 and the rear bars will be minimized. It will be noted, more particularly upon reference to Fig. 2, that the rear steering bars are in a somewhat higher plane than the front steering bars and that the front steering bars are inclined downwardly and forwardly toward the front axle. The interposition of the segmental blocks 11 accommodates the angular relation of the front and rear steering bars and provides a knuckle joint so that the bars will move easily and freely, while the projecting extremities 40 of the front bars will prevent the bars assuming such an excessive angular relation as will prevent their ready operation. The longitudinal slots in the front ends of the rear steering bars permit the said bars to swing about the pivots at their rear ends without binding upon the pin 33 and without becoming disconnected from the carriage or the front steering bars or causing damage to said parts or to any other parts of the carriage.

In Fig. 7, I have shown the carriage mounted upon guide rods 41 which are spaced apart vertically a somewhat greater distance than are the guide rods in the previously described arrangement and a worm shaft 42 is journaled in and extends between the hangers so as to have a threaded engagement with the carriage between the upper and lower guide rods as will be readily understood. One end of the worm shaft is extended beyond the adjacent hanger and is equipped with a beveled pinion 43 meshing with a similar pinion 44 on the end of the steering shaft 45 which is mounted in any convenient manner on the side of the main frame and extends into the cab of the engine.

My improved steering gear is obviously simple in construction and arrangement, being composed of few parts, and may be manufactured and applied to any type of traction engine now in use at a low cost. Inasmuch as my device is connected to both ends of the steering axle, the said axle will be readily moved and will be held rigidly in the position to which it is moved so that the engine may be steered easily and will respond quickly to the impulse imparted to the actuating devices by the engineer.

What I claim is:—

1. A steering gear for traction engines consisting of steering bars connected to the ends of an axle of the engine and converging from said axle, other steering bars pivoted at their outer ends to the engine frame and converging toward said axle, the inner ends of the last-mentioned steering bars being pivotally connected to the inner ends of the respectively adjacent first-mentioned steering bars, and means for shifting the connected ends of the several steering bars laterally.

2. A steering gear for traction engines consisting of steering bars connected to the ends of an axle of the engine and converging toward the longitudinal axis of the engine, other steering bars pivotally secured at their outer ends to the engine frame and having their inner ends overlapping and pivotally connected to the inner ends of the respectively adjacent first-mentioned steering bars, and means acting upon the second-mentioned steering bars to shift the same laterally.

3. The combination with an engine frame and an axle pivotally mounted thereon, of steering bars pivoted upon the engine frame and converging forwardly from their pivots, other steering bars pivotally connected with the opposite ends of the axle and converging rearwardly therefrom toward the first-mentioned steering bars, pivotal connections between the front ends of the first-mentioned steering bars and the rear ends of the adjacent second-mentioned steering bars, and a carriage movable transversely on the engine frame and engaging the first-mentioned steering bars to shift the same laterally.

4. The combination with an engine frame and an axle pivotally mounted thereon, of steering bars pivoted upon the engine frame and converging forwardly from their respective pivots, segment blocks pivoted to the front ends of said steering bars, other steering bars pivoted to said segment blocks and extending toward and pivoted to the ends of the axle, and means acting on the first-mentioned steering bars to shift the same laterally.

5. A steering gear for traction engines consisting essentially of oppositely disposed toggles mounted at the opposite sides of the engine frame and each consisting of a rear steering bar, a segment block pivoted to the end of said steering bar to swing vertically, and a front steering bar pivoted to said segment block to move substantially horizontally.

6. A steering gear for traction engines consisting of oppositely disposed toggles arranged at opposite sides of the engine frame and each consisting of a rear steering bar, a segment block pivoted to the front end of said steering bar to move vertically relative thereto, and a front steering bar pivoted to said segment block to move horizontally relative thereto, said front steering bar being provided with extensions adjacent its pivot to project over the extremity of the rear steering bar.

7. The combination with an engine frame and an axle pivotally supported thereon, of hangers secured to and depending from the said frame, guide bars extending between said hangers transversely of the frame, a carriage slidably mounted upon the said guide bars, a pin fixed in said carriage, steering bars pivoted at their rear ends to the engine frame and provided at their front ends with longitudinal slots engaging around the said pin, and front steering bars pivotally attached at their rear ends to the front ends of said rear steering bars and having their front ends pivotally connected with the ends of the axle.

In testimony whereof I affix my signature in presence of two witnesses.

HARRY F. MANNING. [L. S.]

Witnesses:
ARTHUR LANGABEER,
JAMES NOSSETT.

Copies of this patent may be obtained for five cents each, by addressing the "Commissioner of Patents, Washington, D. C."